Figure 1:
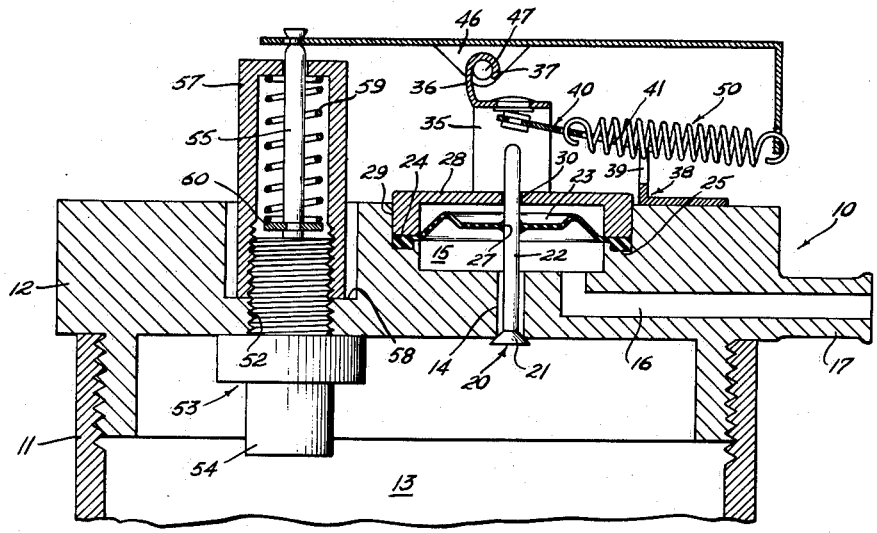

Oct. 30, 1962     C. C. BAUERLEIN     3,061,196
HEAT SENSITIVE VALVE CONTROL ASSEMBLY
Filed July 15, 1959

Inventor
CARL C. BAUERLEIN
by Hill, Sherman, Meroni, Gross & Simpson
Attys.

United States Patent Office 3,061,196
Patented Oct. 30, 1962

3,061,196
HEAT SENSITIVE VALVE CONTROL ASSEMBLY
Carl C. Bauerlein, Lincolnwood, Ill., assignor to The Dole Valve Company, Morton Grove, Ill., a corporation of Illinois
Filed July 15, 1959, Ser. No. 827,228
2 Claims. (Cl. 236—48)

This invention relates to a device for controlling the flow of fluid through a fluid container and more particularly relates to a thermally actuated outlet control valve mechanism.

This invention is more particularly directed to a means for controlling the operation of a poppet type valve associated with an outlet port from a fluid container.

In the embodiment of the invention which I have illustrated in the drawings, a valve is cooperable with a flow port on the upstream side thereof to control fluid flow through the port. A valve stem extends from the valve through the port to the downstream side thereof and is sealed by means of a flexible diaphragm bonded thereto to the container body.

The valve stem is loosely guided within the port so that fluid may flow around the stem within the port to a chamber disposed intermediate a portion of the wall of the container and the flexible diaphragm and thence through an outlet communicable with that chamber.

I contemplate using a snap actuator mechanism having a snap blade cooperable with the valve stem to effect axial movement of the valve stem to thereby move the valve away from the flow port in an upstream direction to permit fluid flow through the port and consequently through the outlet from the container as a function of controlled actuation of the snap actuator.

The snap actuator is actuated as a function of the temperature of the fluid within the container by means of a thermally responsive element which is secured within a wall of the container in heat transfer relation with the fluid therein.

The power member or piston which is extensible from the thermally sensitive element upon increases in ambient temperature conditions therearound is connected to a snap lever of the snap actuator. In the embodiment of the invention shown in the drawings the snap lever of the snap actuator is so pivotally mounted that pivotal movement, thereof caused by axial movement of the power member of the thermally sensitive element acting through an overcenter spring pivotally moves the snap blade with a relatively great force to axially move the valve stem and the valve against the opposing force of pressurized fluid within the container away from the valve port to openly communicate the interior of the container with the outlet.

It will hereafter be understood that where relatively small surface area valves are used in the system or where the valve control mechanism is used to control the flow of relatively low pressure fluid it may be found desirable to alter the pivotal point of the snap lever so that relatively small forces would be required to move the free end of the snap lever past the plane of the snap blade to effect pivotal movement of the snap blade. If the pivotal point of connection of the snap lever with the container were so altered, only a very small and weak thermally responsive element would be required. Such a feature is obviously advantageous from the standpoint of economy in production.

It will further be noted from the following detailed description that the valve is disposed on the upstream side of the port so that the pressure of fluid within the container normally acts to maintain the valve in a seated relation with respect to the port to shut off fluid flow from the interior of the container to the outlet. However, the valve could be disposed on the downstream side of the port so that the overcenter spring of the snap action mechanism acting against the valve stem extending from the valve acted to maintain the valve in a seated position with respect to the port although the aforementioned disposition of the valve would be preferable.

It is also contemplated that an electrical energizing circuit might be controlled through the movement of the snap blade. Such an electrical energizing circuit could be controlled by utilizing the snap blade as a movable contact and by associating a stationary contact at a point disposed adjacent the end of the pivotal stroke of the snap blade or at points adjacent each end of the pivotal stroke thereof.

Thus, if the device which forms the subject of the present invention were used in association with a slug valve for an automatic ice making apparatus in a household refrigerator, the valve mechanism could be used to control the dispensing of a measured volume of water to the ice tray while the switch mechanism could be used to control energization of the motor for operably moving the ice tray and/or for controlling energization of the heater for heating the water within the slug valve prior to dispensing to the ice tray.

It is therefore a principal object of the present invention to provide an improved means for controlling the unidirectional flow of fluid through a container.

A further object of the invention resides in the provision of a poppet valve for controlling fluid flow through a flow port in a container which is controllably moved by a snap actuator.

Yet another object of the invention is the provision of thermally sensitive power means disposed in heat transfer relation with the fluid within the container for effecting flow controlling movement of the poppet valve as a function of the temperature of fluid within the container.

A further object of the invention resides in the provision of a poppet valve associated with a flow port in a container for controlling fluid flow therethrough which is actuated by a snap actuator which, in turn, is actuated by means of an element extensible from a thermal sensitive device disposed in heat transfer relation with the fluid within the container.

A still further object of the invention resides in the provision of a poppet valve for controlling fluid flow through a flow port in a container which is controllably moved by a snap actuator which, in turn, is operable to open and close an electrical energizing circuit.

Figure 2:
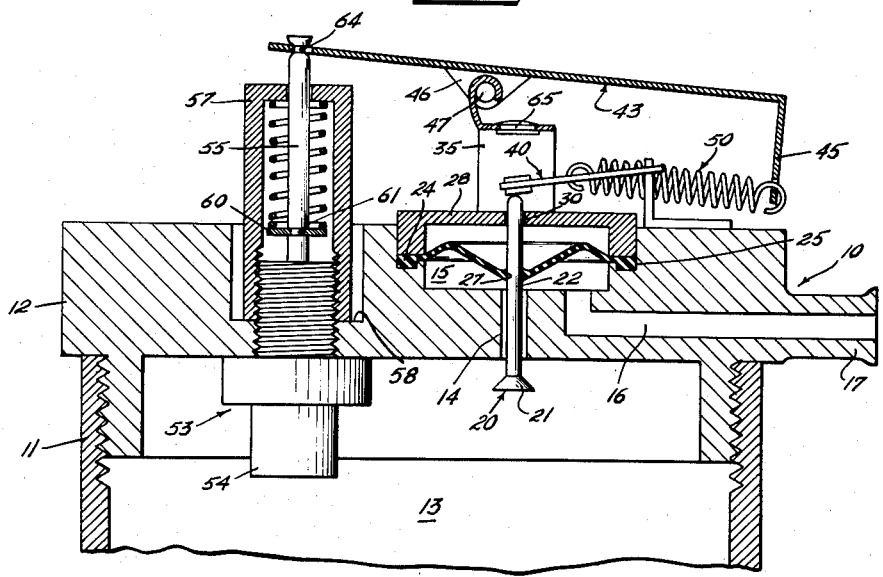

These and other objects of the invention will become apparent from time to time as the following specification proceeds and with reference to the accompanying drawings, wherein:

FIGURE 1 is a fragmental vertical sectional view of a fluid container having a heat sensitive valve control mechanism associated therewith and showing the valve and an associated snap actuator in one position; and FIGURE 2 is a fragmental vertical sectional view through the upper portion of a container which is similar in nature to FIGURE 1 but which shows the snap actuator and its associated poppet valve in a second position.

In the embodiment of the invention illustrated in the drawings a container 10 is shown as comprising a lower section 11 and an upper section 12. The upper section 12 is threadedly mounted in the lower section 11 and is cooperable therewith to define a fluid chamber 13.

A flow port 14 opens through one wall of the upper section 12 to a chamber 15 which, in turn, opens to an outlet 16 which terminates in a connecting nipple 17 formed integrally with the upper section 12.

A valve 20 being formed in the configuration of a truncated cone is disposed adjacent the point where the port 14 opens to the chamber 13 in such a manner that the conical wall 21 of the valve is cooperable with the wall of the upper section 12 defining the port 14 to control fluid flow therethrough.

Assuming that the normal flow of fluid is from the chamber 13 through the port 14, chamber 15, and thence through the outlet 16 the valve 20 may be described as being cooperable with the port 14 on the upstream side thereof.

A valve stem 22 is formed integrally with the truncated valve 20 and extends upwardly from the valve 20 within the port 14. The diameter of the valve stem 22 is considerably less than the diameter of the port 14 so that when the valve stem and its associated valve 20 are moved to the position illustrated in FIGURE 2, fluid can flow past the valve 20 through the port 14 in the passageway formed intermediate the valve stem 22 and the wall of the upper section 12 defining the port 14 to the chamber 15.

A flexible annular diaphragm 23, which may be formed of rubber or other known resilient materials, has a peripheral bead 24 formed thereon which is adapted to be seated in an annular groove 25, formed within the upper section 12 coaxially with and extending around the cylindrical chamber 15. It will thus be observed that the diaphragm 23 in conjunction with a portion of the upper section 12 serves to define the chamber 15. The diaphragm 23 is centrally apertured as at 27 to receive the upper end portion of the valve stem 22. In order to maintain a fluid tight seal between the chamber 15 and the outer surface of the diaphragm 23 the diaphragm 23 is bonded to the stem 22 at the central aperture 27.

A cap 28 having a depending annular ring 29 is seated over the diaphragm 23 so that the depending annular ring 29 seats against the peripheral edge of the diaphragm 23 to maintain a fluid tight seal between the diaphragm and the upper section 12. The cap 28 may, of course, be seated in the position illustrated in the drawings by any suitable means.

The cap 28 is centrally apertured as at 30 to loosely receive the upper free end portion of the valve stem 22. The valve stem 22 is formed of sufficient length so that when the stem is depressed to the position illustrated in FIGURE 2 the upper free end portion of the stem will still extend exteriorly of the cap 28.

Assuming that pressurized fluid is disposed within the chamber 13 and that the valve member 20 is initially in the position illustrated in FIGURE 1, communication between the chamber 13 and the outlet 16 will be closed. However, upon depression of the valve stem 22 the diaphragm 23 will flex downwardly and the stem 22 will axially move to move the valve 20 away from the wall of the upper section 12 defining the port 14 to the position illustrated in FIGURE 2 to permit the passage of fluid from chamber 13 through the port 14 to the chamber 15 and thence through the outlet 16.

Upon release of the downwardly directed force tending to hold the valve stem in the position illustrated in FIGURE 2, the inherent resiliency of the diaphragm 23 will act to return the valve 20 and its associated valve stem 22 to the position illustrated in FIGURE 1. Upon closure of the valve 20 relative to the port 15 the pressure of fluid acting against the flat face of the valve 20 will be effected to maintain the valve in a port closing position.

It will be understood that the fluid pressure differential on the valve itself in conjunction with the force of fluid acting on the underside of the diaphragm 23 will also act to bias the valve 20 to a port closing position. I have found, however, that the resiliency of the diaphragm is necessary to close the valve due to the fluid turbulence created at the mouth of the port when the valve is in a port opened position.

A U-shaped bracket or stirrup 35 is mounted on the upper section 12 and has an upturned arm 36 extending therefrom which terminates in a rolled finger 37. A second bracket 38 is L-shaped in configuration and has an upstanding forked end 39.

A snap blade 40 has a forked end 41 which is pivotally secured to the upturned forked end of the L-shaped bracket 36 so that the snap blade 40 can have pivotal movement with respect to the bracket 38.

A snap lever 43 is also substantially L-shaped in configuration and has a depending free end portion 45. The snap lever 43 also has a pair of depending tabs 46 (only one of which is visible in the drawings) which have a pivot pin 47 journalled for rotatable movement therein. The pivot pin 47 is, in turn, secured within the upstanding curled arm 36 so that the snap lever 43 is pivotally mounted on the bracket 35.

An overcenter spring 50 has its opposite ends secured within apertures formed in the free ends of the snap blade 40 and the snap lever 43 in the usual manner which is well known in the art. The spring 50 is always under tension so that when the snap lever 43 is in the position illustrated in FIGURE 1, wherein the point of connection of the spring 50 with the lever 43 is disposed above a straight construction line extending through the point of connection of the spring with the snap blade 40 and through the pivotal point of blade 40, the snap blade will be disposed in the position illustrated in FIGURE 1. Conversely, when the point of connection of the snap lever 43 with the spring 50 is moved to a point below the construction line hereinbefore mentioned the snap blade 40 will be snapped from the position illustrated in FIGURE 1 to the position illustrated in FIGURE 2 by the overcenter spring 50.

It will be noted that when the snap blade 40 is pivotally snapped from the position illustrated in FIGURE 1 to the position illustrated in FIGURE 2, the pivotal movement thereof acts against the protruding end portion of the valve stem 22 to axially move the valve stem to thereby move the valve head 20 away from the port 14 to permit fluid flow from the chamber 13 through the port 14 and subsequently to the outlet 16.

Any suitable means can, of course, be used for effecting pivotal movement of the snap lever 43 but in the embodiment of the invention illustrated in the drawing, I have shown a means for effecting pivotal movement of the snap lever which is operable as a function of the temperature of fluid within the chamber 13.

The upper section 12 is apertured as at 52 to threadedly receive a thermal sensitive power element 53. The thermal sensitive power element 53 is of a type which is well known in the art and includes a sensing portion 54 which may have a fusible thermally expansible material disposed therein. Upon increases in the ambient temperature about the sensing portion 54 to a point above the critical temperature of the thermal sensitive material within the sensing portion 54 the material will expand and thereby act to extensibly move a power member or piston 55, slidably mounted within the element 53, from the element.

A hollow cylindrical cap 57 is threadedly mounted on the element 53 and is engageable, at its lower edge, with an annular shoulder 58 to draw up the element tightly against the inner surface of the upper section 12 and to provide a means for retaining a return spring 59 therein.

The return spring 59 is seated at one end against the end of the cylindrical cap 57 and is seated at its opposite end on a retainer disk 60 which is secured to a radially reduced portion 61 of the power member or piston 55. The spring 59 acts to return the power member or piston 55 to its retracted position illustrated in FIGURE 1 as the ambient temperature about the sensing portion 54 of element 53 decreases to a temperature less than the critical temperature of the thermal sensitive material within the element 53.

The power member 55 has a radially reduced upper end portion 64 which protrudes from the cap 57 even when the piston 55 is in its most retracted position, with which the actuating end of the snap lever 43 is loosely connected. As a result, axial movement of the power member 55 will effect pivotal movement of the snap lever 43.

The snap blade 40 may constitute the movable contact of an electrical switch, in which case the stationary contact therefor might constitute contact 65 affixed to bracket 35. If the snap actuator is to be used as an electrical switch it is preferable that the electrical connection to the snap blade 40 be made to the bracket 38 so that electrical energy will travel through bracket 38 and thence to the snap blade 40 at the point of contact of the blade with the bracket 38. In this manner freedom of movement of the snap blade will not be impaired. Accordingly, when the snap blade 40 is in the position illustrated in FIGURE 2, the circuit through the contacts will be open while upon movement of the snap blade to the position illustrated in FIGURE 1 the electrical circuit will be closed.

Assuming that fluid is forced from the chamber 13 through the port 14 and thence to the outlet 16 when the valve 20 is in the open position illustrated in FIGURE 2 by the upward movement of a piston (not shown), disposed within the chamber 13, the operation of the device may be described as follows: If the chamber 13 is filled with relatively cold fluid the snap actuator will remain in the position illustrated in FIGURE 1. However, when the temperature of the fluid within the chamber 13 is raised, as by means of a heater coil wound around the exterior of the lower portion 11, to a point above the critical temperature of the fusible thermally expansible material within the thermal sensing portion 54 of the thermal element 53 the power member 55 will be moved extensibly from the thermal sensitive element 53. Such extensible movement of the power member 55 will act to compress the spring 59 and to pivot the free end of the snap lever 43 from the position illustrated in FIGURE 1 to the position illustrated in FIGURE 2. Upon movement of the point of connection of the spring 50 past the plane of the snap blade the blade will be snapped out of engagement with the stationary contact 65 to the position illustrated in FIGURE 2. Such pivotal movement of the snap blade 40 will act to axially move the valve stem 22 downwardly within the valve port 14 to thereby move the valve 20 away from the port 14 to permit fluid flow through the port.

Upon upward movement of the piston within the chamber 13 fluid will be expelled through the port 14, the chamber 15, and the outlet 16.

Conversely, as the temperature of the fluid within the chamber 13 cools, as when additional fluid is added to the chamber, the ambient temperature about the thermal sensing portion 54 of the thermal element 53 will drop below the critical temperature of the fusible thermally expansible material therein and the spring 59 will act to axially move the power member 55 to its normal retracted position as is shown in FIGURE 1. When the power member 55 has returned to this position the snap lever 43 will be pivotally moved in a counterclockwise direction and the free end of the snap lever will move past the plane of the snap blade 40 so that the overcenter spring 50 will act to snap the blade into engagement with the stationary contact 65 to close an energizing circuit through that contact and to permit returning upward movement of the valve stem 22.

The resiliency of the diaphragm 23 in conjunction with the pressure of fluid acting against the flat face of the valve and the diaphragm will act to return the valve stem 22 and the valve 20 to the position illustrated in FIGURE 1 to shut off fluid flow through the port 14.

I have thus described a novel thermally controlled snap actuator and an associated valve assembly for controlling the unidirectional flow of fluid through a container in accordance with the objects and advantages of the invention hereinbefore set forth.

It will, however, herein be understood that this embodiment of the invention has been used for illustrative purposes only and that various modifications and variations in the present invention may be effected without departing from the spirit and scope of the novel concepts thereof.

I claim as my invention:

1. A device for interrupting the unidirectional flow of fluid through a fluid container having a flow port therein comprising a valve adapted to be disposed on the upstream side of the port for controlling fluid flow therethrough normally closed by the pressure of fluid upstream of the port, a snap blade adapted to be pivotally mounted on the container, a snap lever adapted to be pivotally mounted on the container, an overcenter spring interconnecting free end portions of said snap blade and said snap lever, means responsive to the temperature of fluid upstream of the port for effecting movement of said snap lever past the plane of said snap blade to pivotally move said snap blade, and motion translation means disposed intermediate said snap blade and said valve for transmitting pivotal movement of said snap blade in one direction to said valve to move said valve to an open position with respect to said port to permit fluid flow therethrough, wherein said stem is carried by a resilient diaphragm normally biasing said valve to a port closing position.

2. A device for interrupting the unidirectional flow of fluid through a fluid container having a flow port therein comprising a valve disposed on the upstream side of the port for controlling fluid flow therethrough normally closed by the pressure of fluid upstream of the port, a valve stem loosely guided within the port and connected to said valve, a resilient diaphragm sealed to the container and to said stem downstream of said port and biasing said valve to a port closing position, a chamber formed intermediate the container and said flexible diaphragm communicable with the port, an outlet leading from said chamber, a snap blade pivotally mounted on the container and engageable with said stem, a snap lever pivotally mounted on the container, an overcenter spring interconnecting the free end portions of said snap blade and said snap lever, temperature sensitive power means disposed in heat transfer relation with the fluid within the container cooperable with said snap lever and operable to effect pivotal movement of the free end of said snap lever past the plane of said snap blade to effect movement of said stem and said valve relative the port to control fluid flow therethrough upon predetermined fluid temperature conditions within the container.

References Cited in the file of this patent

UNITED STATES PATENTS

| | | |
|---|---|---|
| 1,364,927 | Fulton | Jan. 11, 1921 |
| 1,751,172 | Reinhardt | Mar. 18, 1930 |
| 1,781,287 | Mayo | Nov. 11, 1930 |
| 1,953,446 | Strong | Apr. 3, 1934 |
| 2,067,629 | Flagg | Jan. 12, 1937 |
| 2,253,930 | Carlson | Aug. 26, 1941 |
| 2,581,582 | Ferris | Jan. 8, 1952 |
| 2,584,417 | Branson | Feb. 5, 1952 |
| 2,642,229 | Mueller | June 16, 1953 |
| 2,691,705 | Ray | Oct. 12, 1954 |
| 2,734,773 | Ivins | Feb. 14, 1956 |
| 2,764,385 | Sieling | Sept. 25, 1956 |

FOREIGN PATENTS

| | | |
|---|---|---|
| 281,616 | Italy | Jan. 19, 1931 |